A. H. HAWLEY.
ACCOUNTING AND MONEY HANDLING MACHINE.
APPLICATION FILED MAR. 31, 1917.
1,409,172. Patented Mar. 14, 1922.
10 SHEETS—SHEET 10.
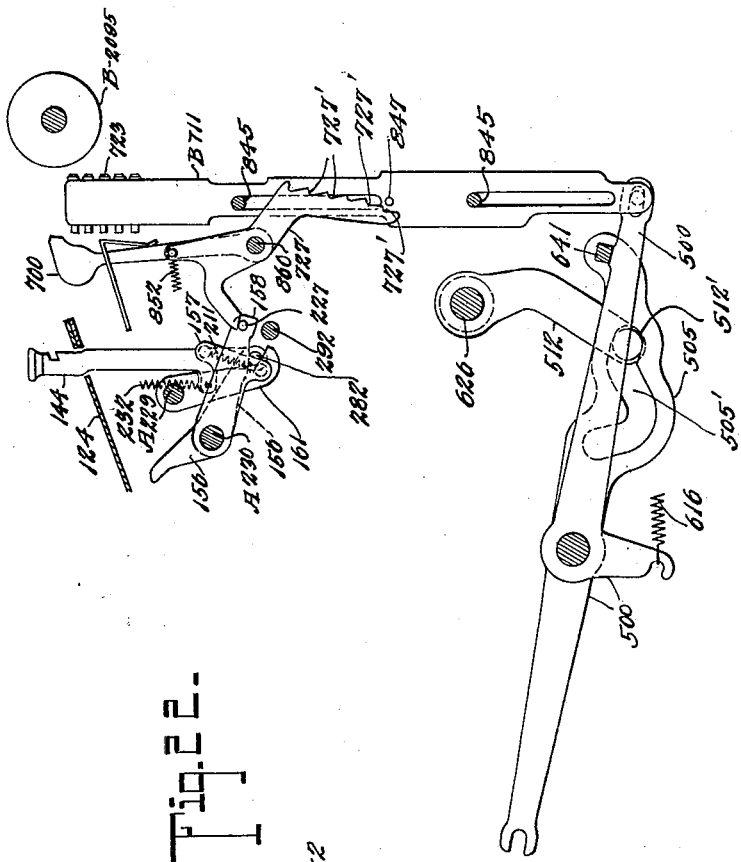
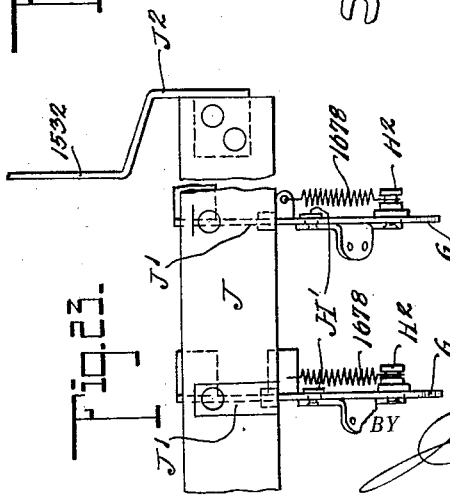
WITNESS:
C.H.Wagner.
INVENTOR.
A.H.Hawley
BY
ATTORNEY.

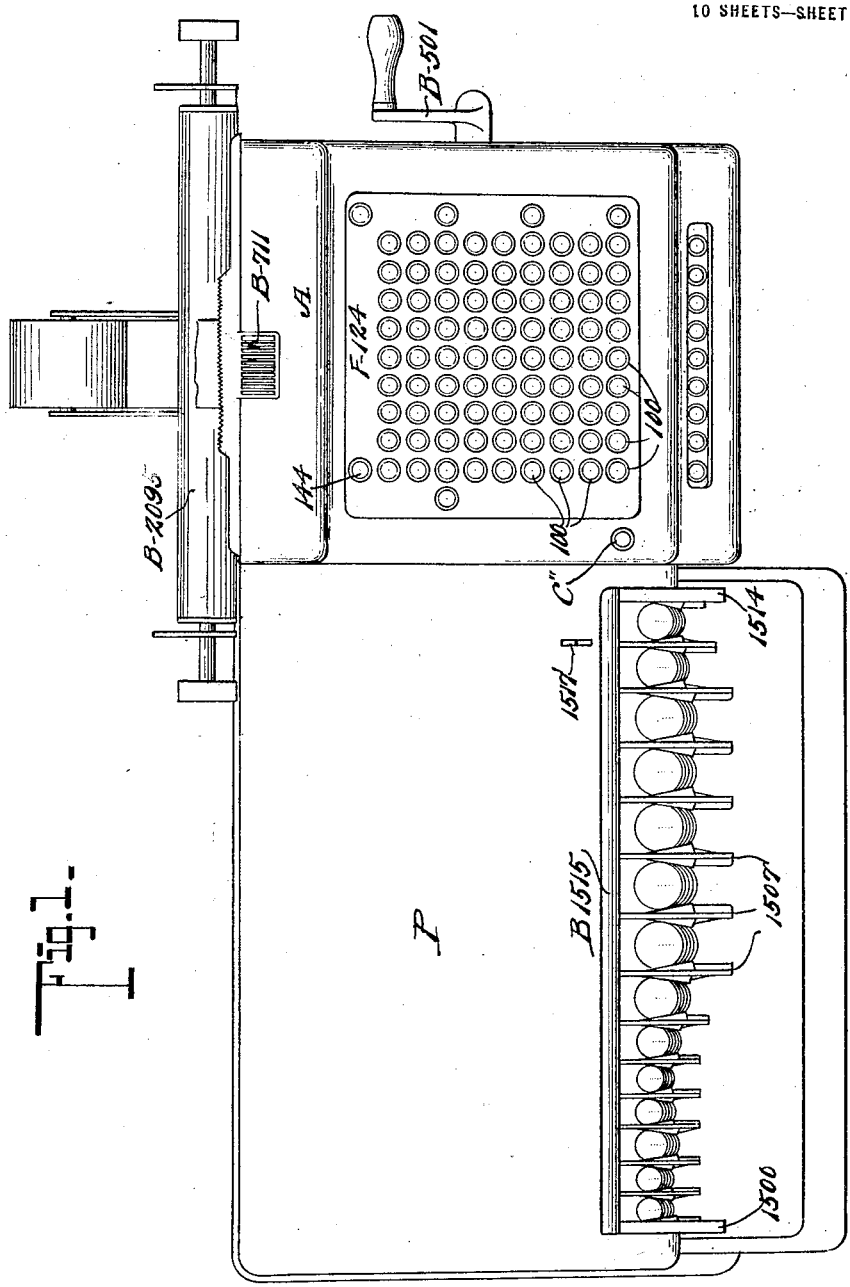

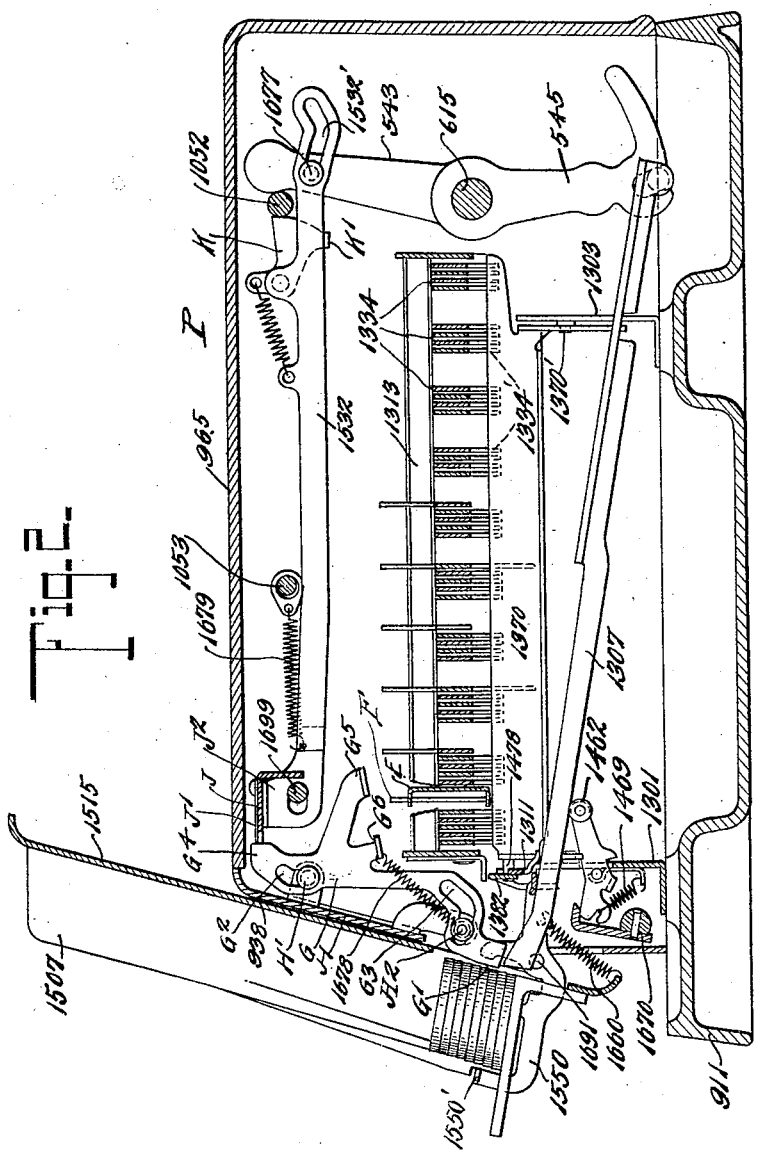

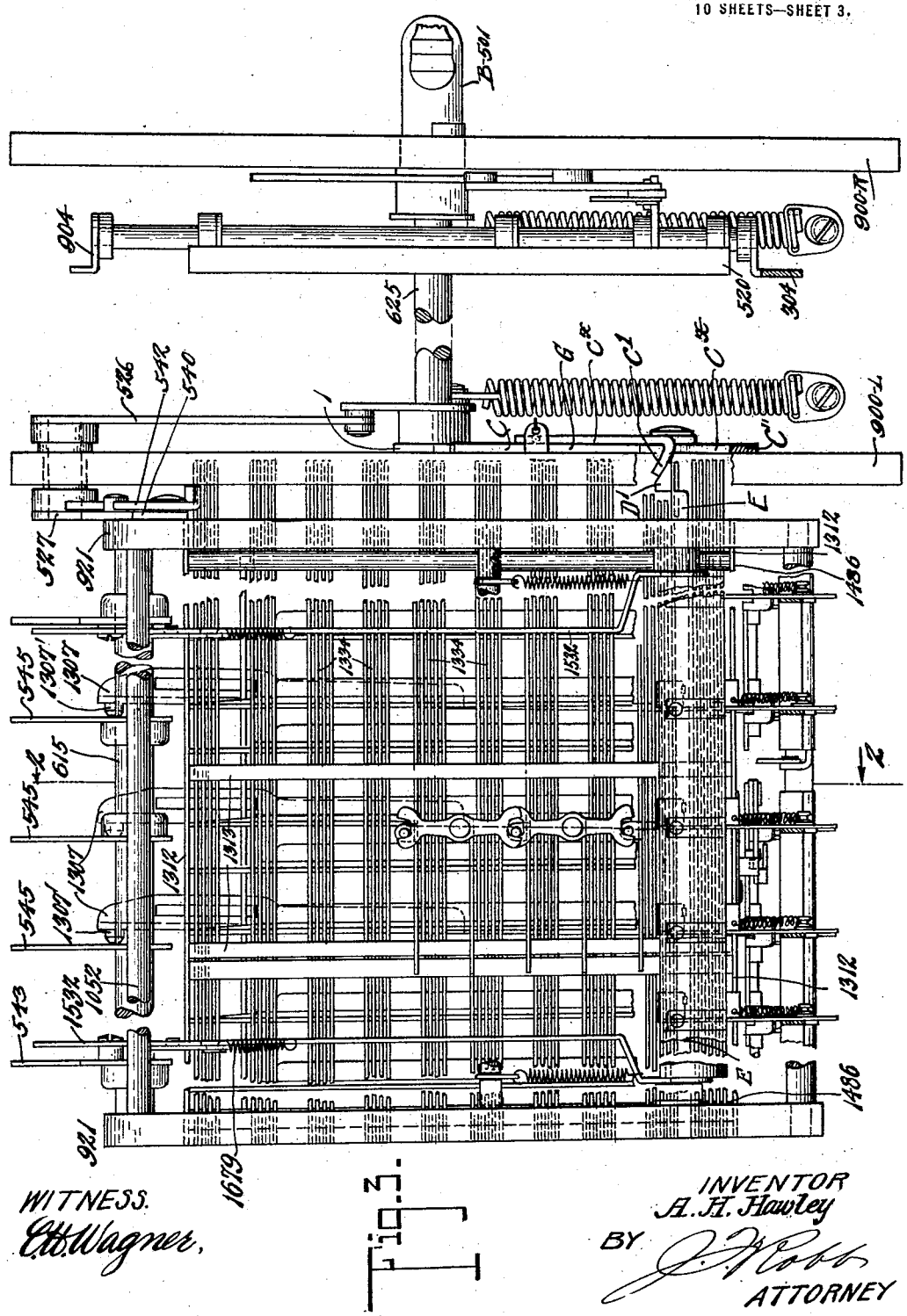

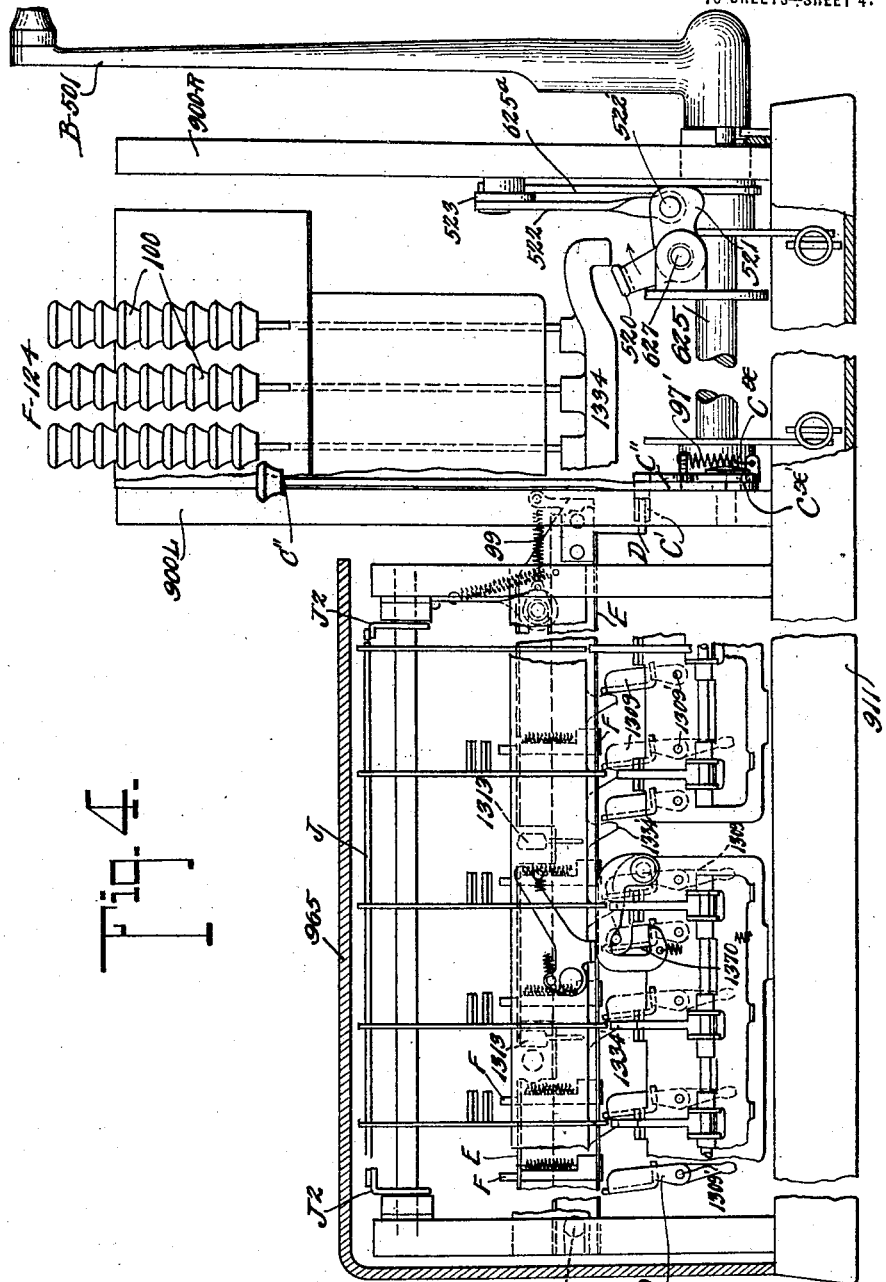

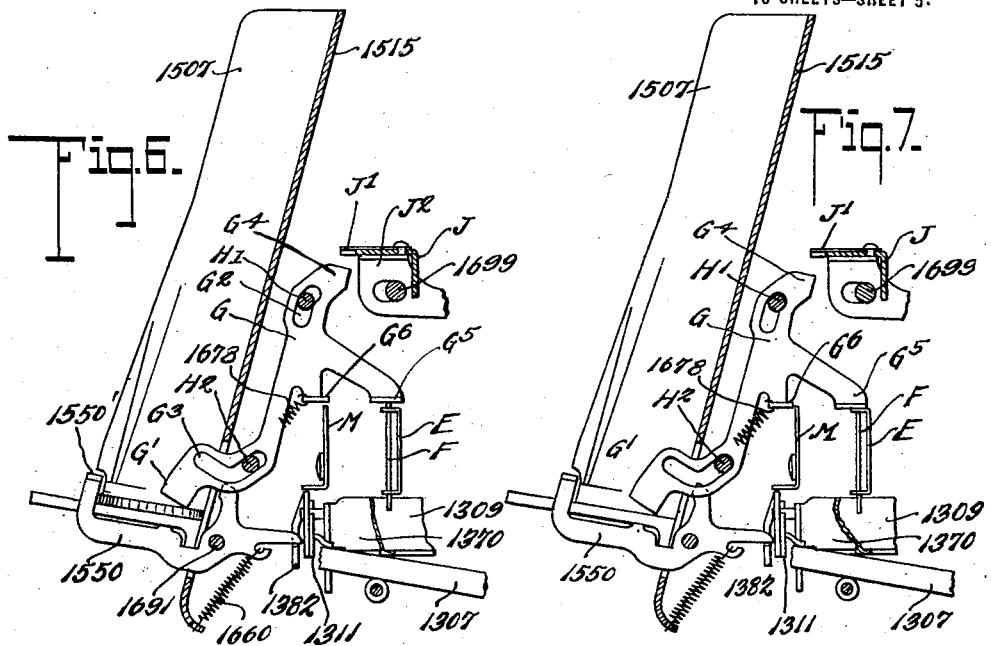
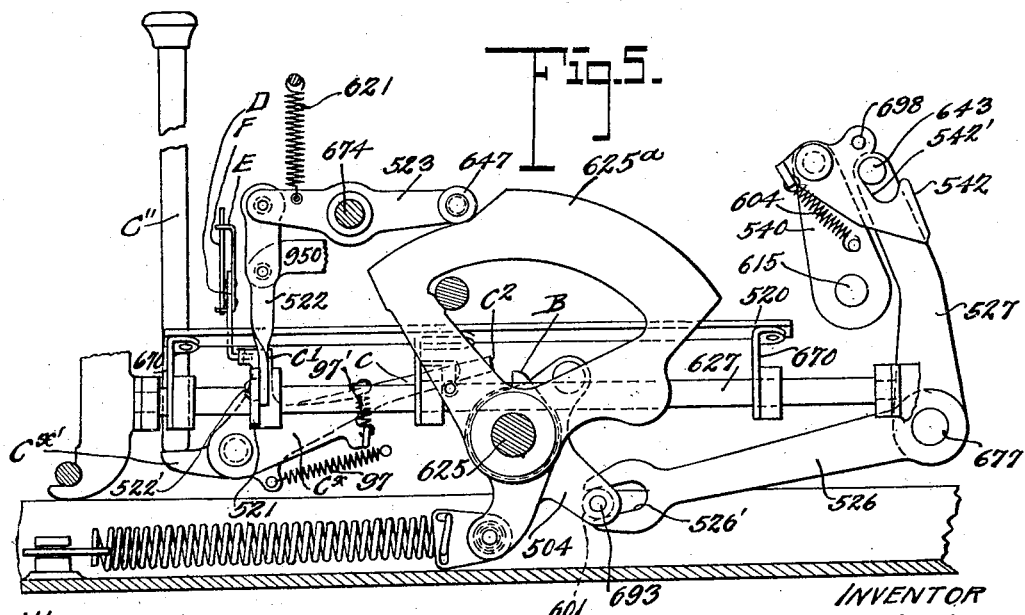

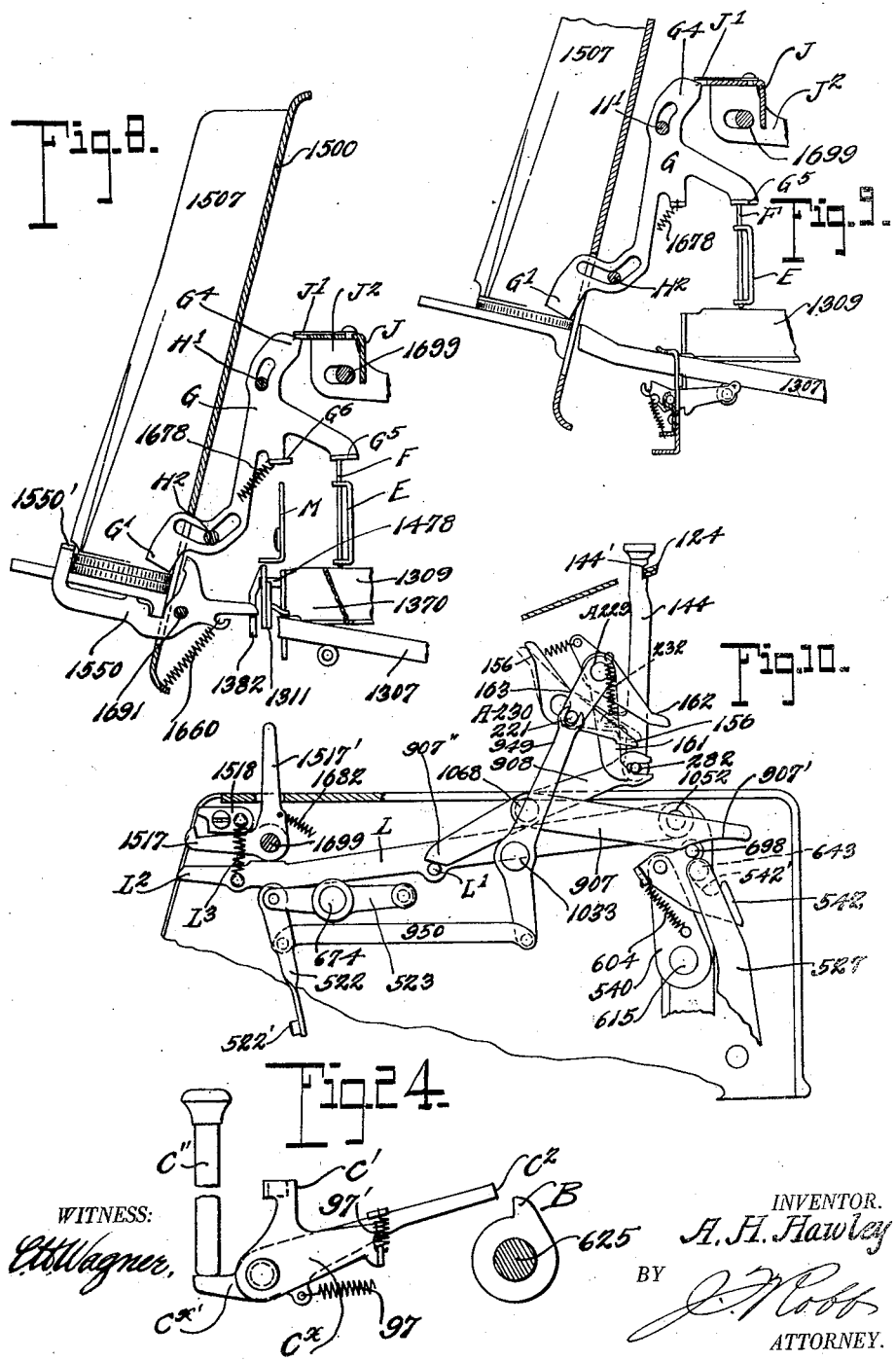

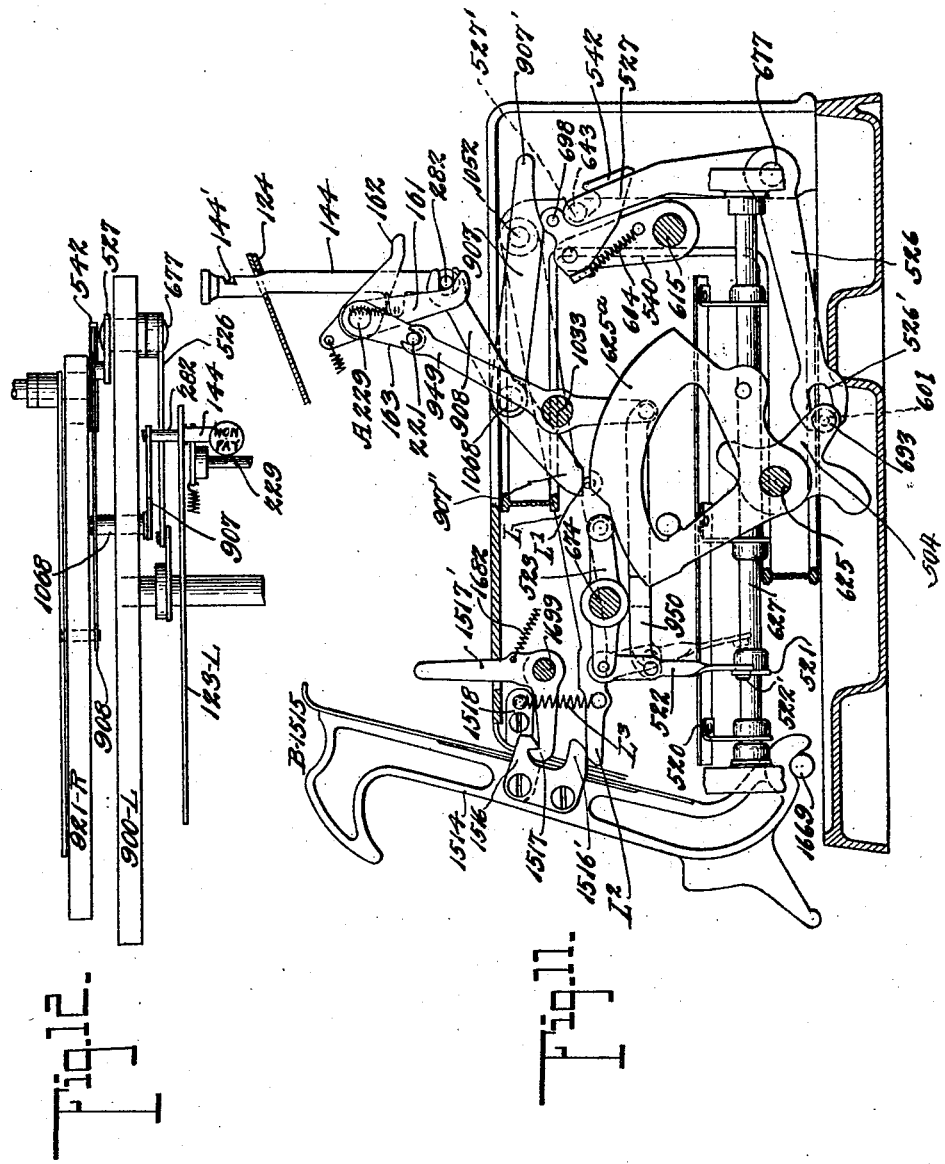

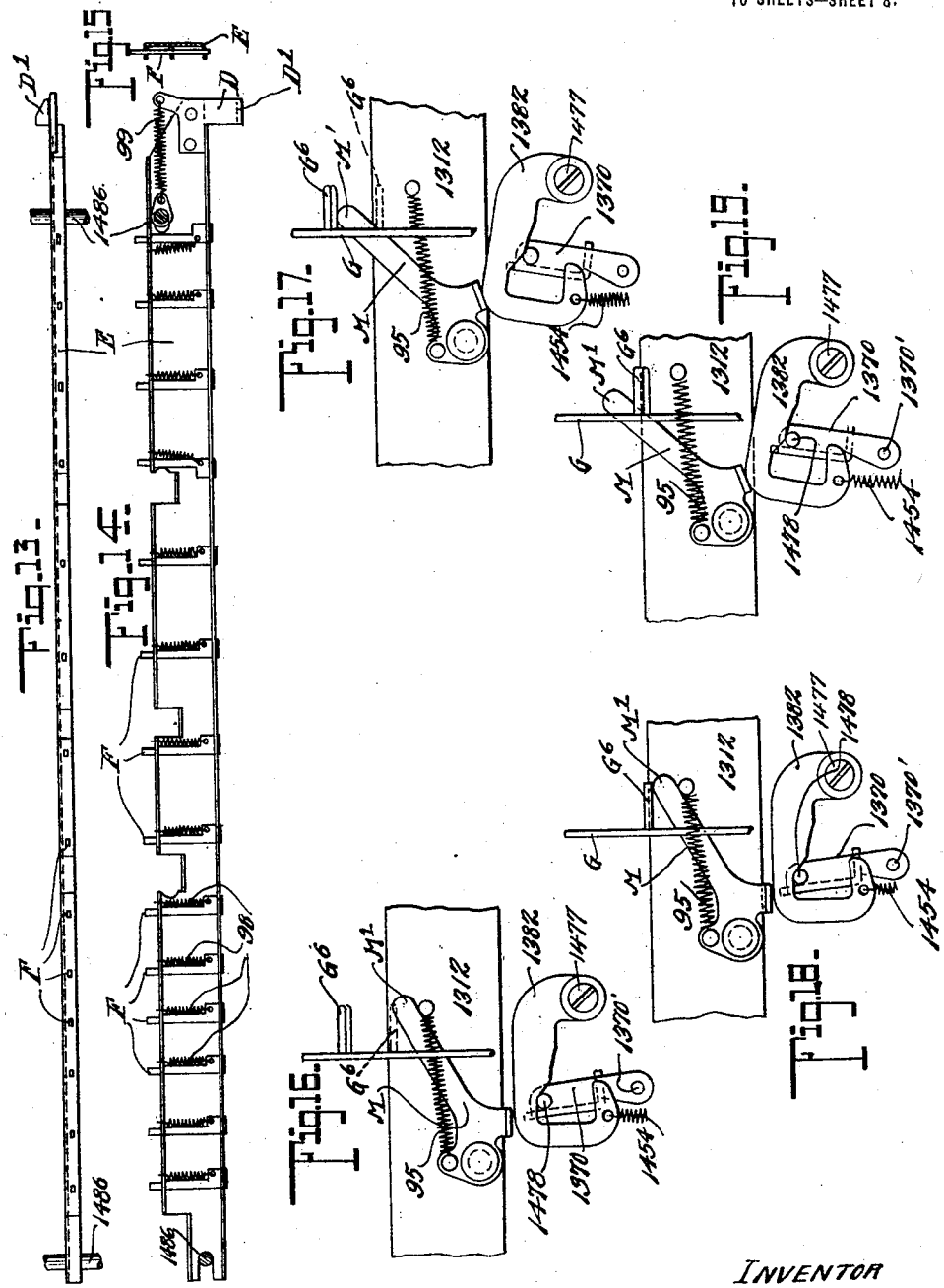
A. H. HAWLEY.
ACCOUNTING AND MONEY HANDLING MACHINE.
APPLICATION FILED MAR. 31, 1917.
1,409,172.
Patented Mar. 14, 1922.
10 SHEETS—SHEET 8.
WITNESS
C.H.Wagner.
INVENTOR
A. H. Hawley

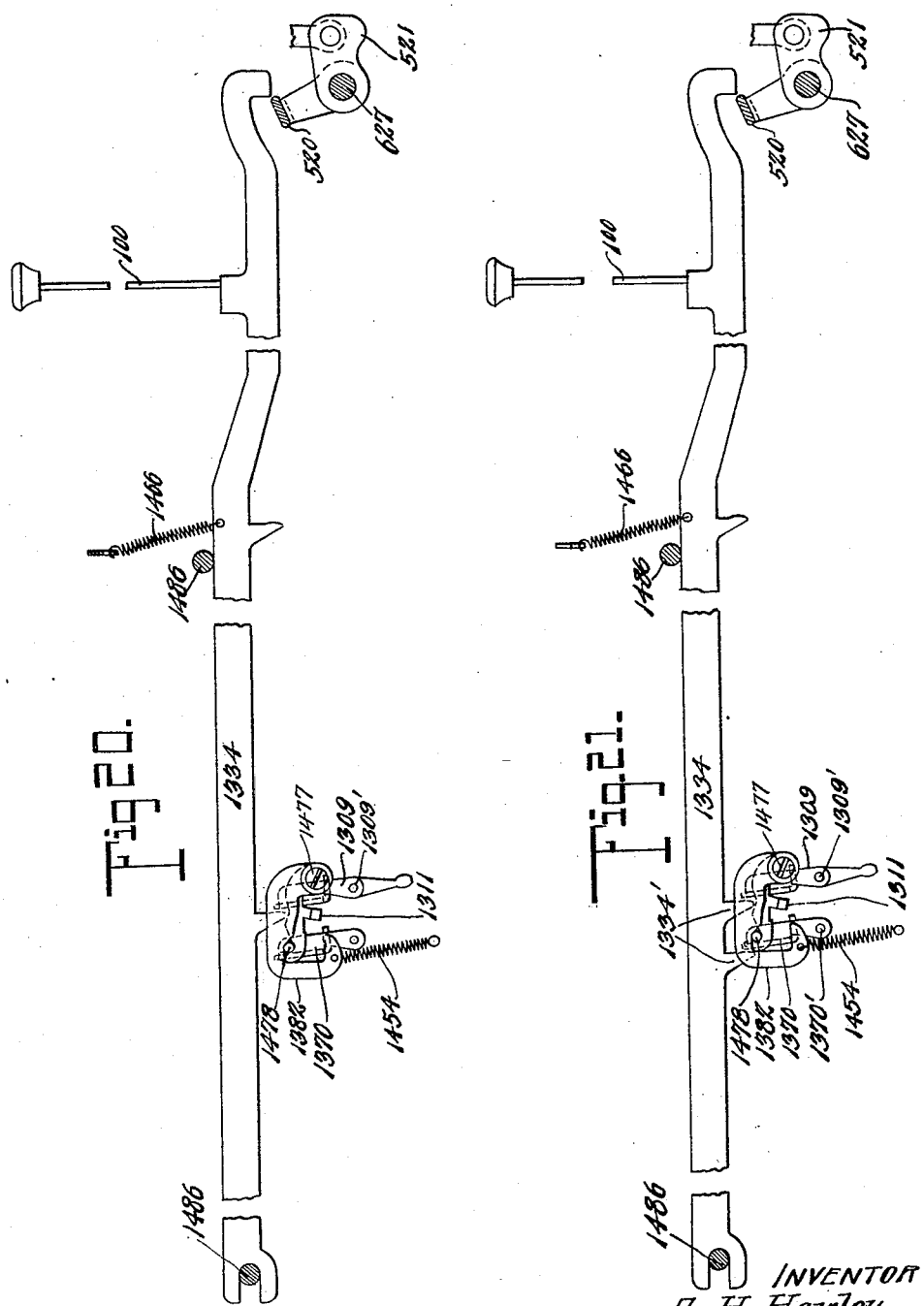

UNITED STATES PATENT OFFICE.

AMOS H. HAWLEY, OF TERRE HAUTE, INDIANA, ASSIGNOR TO INTERNATIONAL MONEY MACHINE COMPANY, OF TERRE HAUTE, INDIANA.

ACCOUNTING AND MONEY-HANDLING MACHINE.

1,409,172.  Specification of Letters Patent.  Patented Mar. 14, 1922.

Application filed March 31, 1917. Serial No. 158,923.

*To all whom it may concern:*

Be it known that I, AMOS H. HAWLEY, a citizen of the United States, residing at Terre Haute, in the county of Vigo and State of Indiana, have invented certain new and useful Improvements in Accounting and Money-Handling Machines, of which the following is a specification.

This invention embodies certain novel improvements relating to combined accounting and money handling or money registering machines especially advantageous for use in making up the payrolls of factories or establishments having a large number of employees. The invention involves certain improvements useful only to improve the combinative or conjoint operation of main and auxiliary mechanisms of combination machines such as referred to; and other improvements useful in connection with money paying out machines generally, whether used in combination with an accounting or like machine, or not.

A combination machine of the class for which certain of the present improvements are especially designed usually embodies an accounting or adding machine as the main section, associated with an auxiliary section which may be a money paying out mechanism adapted to pay out money in accordance with amounts set up on the accounting machine, or the auxiliary section may be a special calculating machine adapted to register the least number of coins or notes or both, in an amount of a transaction performed on the accounting section.

These improvements are used in connection with the payroll machine of the "International" type and in this machine the auxiliary section is of a convertible type, namely one in which the removal of the coin magazine and the substitution therefor of a coin registering attachment, or vice versa, permits of converting the auxiliary section from a paying out mechanism into a special calculating mechanism, or the substitution may be the reverse of that just mentioned, as the requirements demand.

In the combination machine just generally described, there is ordinarily provided a means to disable the auxiliary section, whether it be a paying out or calculating mechanism of the fixed or convertible type. The said disabling means is ordinarily manually operable and permits of the use of the accounting or main section of the machine alone. An essential object of this invention has been to devise suitable instrumentalities whereby upon the removal of the coin magazine attachment, or the registering attachment, whichever may be used on the auxiliary section, the operating mechanism of the entire auxiliary section will be automatically incapacitated or made inoperative. The incapacitating means for the mechanism of the auxiliary section as just referred to enters into desirable cooperation with the main disabling means controlling separate and conjoint operation of the two sections of the machine in a manner which will be detailed fully hereinafter.

Still another feature of importance to this invention, but applicable to money paying out machines generally, resides in the provision of special locking means capable of preventing a complete operation of the main actuator of the machine in the event there happens to be an insufficient number of coins in any one or more of the holders of the coin magazine. While means for this particular purpose have been heretofore proposed, the peculiar instrumentalities used in the present invention are designed with a view to advantageous cooperation with other general features of construction of the machine, as will also be appreciated on reference to the detailed description found hereinafter.

Another object of the invention has to do with the detachability of the coin magazine, or any attachment by which the latter may be replaced, such as the special calculating attachment, in reference to the effect of the removal of such part from the machine upon certain characterizing printing means it is customary to employ. This characterizing printing means ordinarily consists of a special type carrier, the movement of which is adapted to be variably limited to bring to printing position any one of several characterizing types by which the characterization is actually printed after the manner of the operation of the usual types of type carriers in listing. It is contemplated by this invention that means shall be operable upon removal of the coin magazine or any substituted part from the machine to make it impossible for the characterizing type carrier to be adjusted to the position in which it would print that character ordinarily employed only when the magazine or any substitute attachment therefor, is used.

With the above and other objects in view, this invention consists in the construction, combination and arrangement of parts all as hereinafter more fully described, claimed and illustrated in the accompanying drawings, wherein:

Figure 1 is a top plan view of a machine embodying the improvements of this invention, said machine being of the type known as the "International" pay-roll machine. Figure 2 is a transverse sectional view taken about on the line 2—2 of Figure 3. Figure 3 is a plan view showing more clearly the selecting mechanism, the actuators or ejectors controlled thereby, and other details, the casing of the machine omitted. Figure 4 is a front view partly in section and partly in elevation, and partly broken away, bringing out more clearly the arrangement of the selecting and operating instrumentalities, certain parts omitted for the sake of clearness. Figure 5 is a view partly in section looking toward the right-hand end of the machine, showing clearly the connection between the main and ejector shafts and the operating means for the selector shaft. Figures 6, 7 and 8 are fragmentary sectional views taken through one of the double payment coin holders, showing the arrangement of the locking devices for the selector and operating mechanisms, said locking devices being controlled by predetermined diminution of the coins within the coin holders. Figure 9 is a view similar to Figure 8 showing a single payment coin holder and associated mechanism, however. Figure 10 is a fragmentary transverse sectional view showing the automatic disabling means for the ejectors or actuators and controlling selector mechanism, said means operating as an incident to the removal of the coin magazine, or any substitute mechanism, from the left-hand section of the machine. Figure 11 is a view similar to Figure 10 excepting that the coin magazine is shown in proper position, the disabling key being released and operative connection established between the main and auxiliary actuating shaft. Figure 12 is a fragmentary view looking down upon certain of the parts shown in Figures 10 and 11. Figures 13, 14 and 15 are top plan, vertical longitudinal sectional and transverse sectional views of the actuator lock operating bar and connected parts thereon. Figures 16, 17, 18 and 19 are fragmentary views showing various adjustments of certain parts otherwise illustrated in Figures 6, 7 and 8. Figure 20 is a detail view of a double payment or double movement controlling selector and the ejector or actuator operating means associated therewith, and certain other parts. Figure 21 is a view similar to Figure 20, the mechanism, however, being a single payment or single movement controlling device. Figure 22 is a detail sectional elevation partly broken away and certain parts omitted, showing the means employed to control adjustment of the item characterizing type carrier for printing a character indicative of a payment being made, and means for preventing such adjustment when the paying section of the machine is disabled upon removal of the coin magazine. Figure 23 is a fragmentary view showing more clearly the cooperation of the angle bar with the controlling or feeler members of the coin holders. Figure 24 is a detail view of the special manual release means for the main actuator.

*General construction of machine.*

The machine to which the improvements hereinafter described are applied is primarily intended to facilitate the making up of pay-rolls, or the like, and in one phase of construction and operation is a combined accounting and money handling machine. As such, the said machine comprises an adding machine section and an associated section for paying out money, as by delivering coins or bills, the two sections being so combined as to admit of disabling that for paying out purposes when the accounting section is desirable for use alone. In another phase of construction and operation, with which certain improvements hereinafter set forth have to do, the said money handling mechanism or a portion thereof is adapted to be converted into a special calculating mechanism merely by removing the money holding magazine of the machine and substituting therefor a special registering attachment susceptible of being operated concurrently with the adding machine section for performing special calculating operations in conjunction therewith.

Some of the improvements to be later described in detail have utility for cooperation with the general combined machine herein referred to whether the special mechanism auxiliary to the accounting machine is adapted for money handling purposes or modified so as to be adapted for use as a special auxiliary calculating mechanism for the accounting machine. Other of the improved instrumentalities to be set forth are primarily intended to function as an incident only to the employment of the accounting machine in conjunction with one or the other of the stated auxiliary mechanisms.

For the purposes of this description, the accounting or adding machine, certain parts of which are referred to hereinafter, will be understood to be the main mechanism of the combined machine, whilst the money handling or special calculating section associated therewith will be understood to be an auxiliary mechanism because its functions are primarily of an auxiliary nature.

In connection with the aftergoing description, reference may be had to explanations of certain features of construction of the improvements of this invention, as applied, to United States patents to Runquist, No. 1,195,860, granted August 22, 1916, to White, No. 1,192,721, granted July 25, 1916, and to Robert T. Brockman, No. 1,260,310, granted March 26, 1918. The above patents show details of construction used in connection with the present invention to such an extent as to make unnecessary the specific description of such details so that the latter are only generally referred to hereinafter. Referring to Figures 1 and 2, the accounting section of the machine, or the main section, is designated A and the auxiliary section or mechanism P. The section A is really an adding machine of the general type shown in the White patent aforesaid, while the section P has many parts equivalent to or like those of the Runquist patent aforesaid, and also the Brockman patent. The amount keys of the accounting machine A are denoted 100, the disabling key 144, and there are provided special operation keys at the right-hand side of the keyboard for totaling, sub-totaling, repeating, and correcting control actions of the mechanism. The accounting section or machine includes suitable listing mechanism comprising type carriers B-711, a special type carrier for characterizing purposes being used and shown best in Fig. 22, and a paper carriage B-2095. The depression of any of the keys 100 and the forward pulling of the handle of the main actuator B-501 results in the setting up of a transaction and the accumulating and printing of the same after the manner of the operation of the adding machine of the above identified White patent or indeed after the manner of all adding machines of the particular type shown in said patent. As shown in Figures 2, 4, 20 and 21 there is associated with the keyboard mechanism, a selector mechanism embodying a plurality of selectors 1334, one for each key 100. The selector mechanism forms a part of the auxiliary section of the machine, which auxiliary section is primarily comprised of three essential parts, namely, a series of actuators 1307 susceptible of operation one or more at a time, actuating means for said actuators consisting of the auxiliary shaft 615 and arms 545, in Figure 2, and means operable by the actuators 1307 which means involves the attachment shown in Figure 2 comprising the coin magazine B-1515 in which are contained coins adapted to be directly engaged and ejected by the actuators 1307. The actuators 1307 are ejectors when the auxiliary section of the machine is a money handling or paying section. The magazine B-1515, however, is susceptible of removal so that a different attachment consisting for instance of a registering mechanism may be substituted therefor whereupon the actuators 1307 are no longer ejectors but are actuators for registering devices of such attachment. The registering attachment is not illustrated but may be of the type described in the application of Sorum and Brockman, Serial Number 838,663, filed May 15, 1914.

When a registering attachment is substituted for the magazine B-1515, the auxiliary section of the machine is converted from a money handling section into a special calculating or registering section. More specifically speaking the money handling section acting auxiliary to the accounting or adding machine is intended to pay out amounts of money corresponding with amounts set up, accumulated and listed by the operation of the accounting machine; and in like manner the auxiliary section as a special calculating machine is intended, on substitution of a registering attachment, for the coin magazine B-1515, to register the least number of coins or bank notes that are required to make up an amount set up on the accounting machine.

The manner in which the main and auxiliary sections of the machine are linked together for conjoint operation will now be described. Virtually the selector mechanism including the parts 1334 is a linkage between the keys and the actuators 1307 whereby the latter are controlled from the keys, and there is provided additionally a linkage consisting of connections between the main actuator shaft 625 and the auxiliary shaft 615 whereby motion may be transmitted to the actuators 1307 from the main handle B-501. The selectors 1334 are formed with hooks at their right-hand ends and are longitudinally movable rightwards as well as movable downwards by depression of the keys 100. As seen in Figures 4 and 11 on the main shaft 625 is a cam 625$^a$ adapted to engage a roller on the adjacent end of the lever 523 whereby to rock said lever as the cam is moved by the handle B-501. The other end of the lever 523 is connected by a link 522 with an arm 521 on the selector shaft 627, see stud connection 522'.

It will be apparent that when the link 522 is in the full line position of Figure 11, rocking of the shaft 625 will rock the selector shaft 627. Furthermore, if any selector or selectors 1334 are depressed by their keys, the hooks at the right-hand ends of said selectors will be engaged with the bail 520. Owing to the above arrangement of parts the selectors 1334 may be pulled longitudinally to the right by operation of the handle B-501.

The selectors 1334, see Figure 2, have one or more projections 1334' extending downwardly therefrom and adapted to engage the bails 1309 which are connected to and operate the members 1307 in the manner described in the Runquist patent previously identified. Depression of the five-cent key 100 therefore is adapted not only to accumulate and list the equivalent amount, but to set a selector 1334 controlling one of the actuators or ejectors 1307 so that on movement of the handle B-501 said selector 1334 will be pulled longitudinally and through a bail 1309 will shift a proper ejector or actuator 1307 so as to connect the rear end of said actuator with its normally spaced arm 545. A little later in the movement of the handle B-501 the shaft 615 which carries the arms 545 is rocked and the part 1307 previously adjusted is moved outwards to pay out a coin or register a piece of money selected to make up a predetermined amount.

The connections between the main shaft 625 and the shaft 615 are seen best in Figure 11. They comprise an arm 504 on the shaft 625 having a stud 693 carrying a roller 601 engaged with a bifurcation 526' of an arm 526. The arm 526 is carried by a stub shaft 677, see Figure 12, the latter being supported by the left frame section of the accounting machine. The shaft 677 has an arm 527 provided with a stud 527'. On its right-hand end the auxiliary shaft 615 has an arm 540 carrying the hook 542 engageable with the stud 527', the engagement taking place sometime after the initial movement of the arm 527 under the impulse of the pull upon the handle B-501. The hook 542 is movable upwards and downwards to engage and disengage respectively in relation to the stud 527' and a spring 604 tends to raise the hook into the desired engagement. Obviously as the shaft 625 is rocked forwards, arm 526 is raised, arm 527 is carried rearwards, and if the hook 542 is in the path of the stud 527' arm 540 will be pulled rearwards and the auxiliary shaft 615 rocked to move the actuators 1307, which may have been connected with arms 545.

It is by the foregoing described mechanism that conjoint operation of the main and auxiliary sections of the machine is obtainable. Means are provided to prevent such operation, however, when the accounting machine is desired to be used alone.

*Auxiliary section disabling means.*

As seen best in Figures 11 and 12, the disabling key 144 has a notch 144' to engage the keyboard plate to hold said key depressed. In its normal uppermost position the key 144 is adjusted so that conjoint operation of the instrumentalities of the main and auxiliary sections of the machine is insured. By the depression of the key 144, a stud 282 at its lower end, owing to engagement in a bifurcation of an arm 908, rocks downwards said arm and correspondingly rocks its shaft 1068 together with a second arm 907 carried by said shaft. By this means the arm 907 in lowered, and caused to engage a stud 698 on the hook 542 and thus depresses the hook sufficiently to prevent the stud 527' of the arm 527 from pulling on the hook and operating the auxiliary shaft 615, when the main actuator B-501 is operated. Simultaneously with the above action of parts the stud 282 of the key 144 engages and rocks forward the arm 161 on the shaft A-229. The shaft A-229 carries another arm 163 having a stud 221 engaging a bifurcation of a lever 949 pivoted between its ends to an axis 1033. The lower end of the lever 949 is connected by a horizontal link 950 with the vertical link 522 previously mentioned, and the rocking of the parts just referred to, by depressing the key 144 dissengages the stud 522' of the link 522 from the arm 521 of the selector shaft 627, see dotted line position of link 522 in Figure 11. Under the foregoing conditions it is obvious that the selector shaft 627 and its bail 520, together with the auxiliary shaft 615, are incapacitated for operation owing to assumption of inactive positions by the parts 522 and 542 respectively. While the described parts are adjusted in the manner stated, the auxiliary section of the machine is disabled and the main or accounting section may be freely operated so as to perform its regular function or functions alone.

*Automatic actuator disabling means.*

Referring to Figures 10, 11 and 12 especially and to the disabling devices described as being controlled by the key 144, it will be obvious that the coin magazine B-1515 comprising the end members 1500 and 1514 and the intermediate members 1507, is mounted at the front of the auxiliary section. The end members 1500 and 1514 have hooks engaging over studs 1669 on the side frames $921^r$ and $921^1$ of the auxiliary section. Said end members have also the fixed catches 1516 engageable with the pivotally movable catches 1517 which are fixed to a shaft 1699, one of the catches 1517 having a vertical handle 1517' projecting above the casing and manually operable to rock the shaft 1699 to disengage the parts 1516 and 1517 when it is desired to remove the magazine B-1515. A spring 1682 maintains the engagement between the parts 1516 and 1517. One of the fixed catches 1516, seen in Figure 11, has a cam arm 1516' adapted to engage the front end $L^2$ of a lever L so as to hold the latter in a lowered position normally. If the magazine B-1515 be removed by the operator after he actuates the handle 1517' as stated, the disengagement of the cam arm 1516' from the lever L is effected and said lever under the action of the comparatively strong spring $L^3$ will cause its stud $L^1$ to act on an extension 907'' of the arm 907 in such a manner that the shafts 1068 and A-229 are rocked, the result being the actuating of the connections 522—521 and 542—527' so that the mechanism of the auxiliary section of the machine is rendered inoperative while the magazine B-1515 is displaced.

In the above operation the disabling key 144 is of course drawn down and by the spring 232 is caused to engage at its notch 144' with the keyboard top plate 124 (see Fig. 22). Owing to this arrangement of the parts the auxiliary mechanism will remain disabled even though the magazine B-1515 is replaced and until the key 144 is manipulated to effect its release or return to uppermost position. The spring $L^3$ is a positive actuator and while the magazine B-1515 is removed the mechanism of the auxiliary section is not susceptible of operative connection with the mechanism of the main section or accounting machine section by any proper manipulation of the disabling key 144. Under the conditions stated the mechanism of the auxiliary section may be disabled in two ways, by the ordinary manual operation of the disabling key 144, or the automatic operation by the spring $L^3$ when the magazine B-1515 is detached.

It is to be observed that in its broader phase of construction the means which has just been described is a means to automatically render inoperative the connections between the main and auxiliary sections of the machine, as an incident to the detachment of one of the essential parts of the auxiliary mechanism. In the case described this essential part is of course the coin magazine but where the auxiliary section embodies instead of the coin magazine, a special registering attachment substitutable for said magazine, the latter would be equipped with means equivalent to the means 1516 and 1516' of the coin magazine and the automatic disabling of the auxiliary mechanism or section would be effected under such conditions in a manner like that set forth above as respects the detachable magazine B-1515.

In still another phase of construction it is to be understood that the auxiliary mechanism of this machine together with the controlling and operating instrumentalities therefor constitute an operative machine involving a removable part, together with certain instrumentalities described such that on detaching said removable part the operating instrumentalities are incapacitated.

*Control of characterization printing device from disabling means.*

This feature of the invention will be understood on reference to Figures 11, 12 and 22. The shaft A-230, Fig. 22, has thereon the rigid arms 156 and 157, and the loose arm 158 adjacent to arm 157. The arm 158 is connected by a spring 211 to the arm 157 for reasons not having to do with the present invention and for the purposes of this description the arm 158 may be considered as practically rigid upon the shaft A-230. The arm 156 projects rearwardly from the shaft A-230 and engages the stud 282 of the key 144, Figures 10 and 22. When the key 144 is in its upper or released position the auxiliary section of the machine is operative and the engagement of the stud 282 serves to move the arm 156 to the dotted line position of Figure 10, correspondingly rocking the shaft A-230. The arm 158 has a stud 227 engageable with the front end of the notched sector 727 mounted to swing on the shaft 860 and having the notches 727' engageable with a stud 847 on the special characterizing type carrier B-711, when the latter is carried upward by a spring 616 acting through a lever 500 in the manner shown in the White patent previously referred to. Should the coin magazine B-1515 or any substitute attachment be displaced from its operative position as shown in Fig. 11, the spring $L^3$ will operate the lever L, and coacting parts 907'' and 908 will operate key 144 carrying the stud 282 downward out of engagement with the arm 156. This will permit the rocking of the shaft A-230 under the action of the spring 852 connected with the sector 727 and the latter will be moved to present its lowermost notch 727' for engagement by the stud 847 of the type carrier B-711, under which conditions said type carrier will be prevented from movement to a position in which any of its type my be actuated for printing purposes.

*Coin-controlled main actuator locking mechanism.*

Reference is made to Figures 5 to 9 inclusive, Figures 13 to 19 inclusive and Figure 23 of the drawings.

An understanding of the mechanism now to be described may be more readily had if it is borne in mind that the setting of the keys of the main or accounting section sets up the accounting mechanism for its proper operation and sets up the selector mechanism including the bars 1334 for their proper operation. The movement of the handle B-501 causes the proper or complete operation of the accounting devices to accumulate and list the transaction, and during the preliminary movement of said handle the selected selectors 1334 are moved longitudinally thereby shifting the selected ejectors or actuators to connect them with the arms 545 and the final or subsequent movement of the handle actually moves the actuators or ejectors 1307 to perform their actuating or ejecting function.

The mechanism now to be set forth is designed to prevent the actuating or ejecting functioning of the members 1307 if any coin holder or holders do not contain sufficient coins to pay out an amount equivalent to the amount of the transaction performed on the machine. In obtaining the desired result by the locking mechanism it may be noted that through the instrumentalities employed the preliminary operation of the handle is utilized as a means for actually locking said handle against having that portion of its movement which under normal conditions would move the ejectors 1307 forwards to perform their ejecting functions.

Passing now to the construction employed, as seen in Figure 5 a toothed member B is fixed on the shaft 625 and cooperative therewith is a pivoted stop lever C carried by the side frame 900-L. A spring 97 is connected to the lever C and normally holds the tooth-engaging end of said lever upraised away from the tooth of the member B. A release key C'' is adapted to engage the other end of the lever C. The lever C is adapted to be rocked so as to engage it with the member B to thereby prevent movement of the main actuator sufficiently to cause paying out of money from the coin magazine B-1515, if sufficient coins are not on supply within said magazine, to make a necessary payment. Said lever C is indirectly actuated for the above purpose through a supplementary lever C$^x$ co-axial therewith and having connection at one end with the lever C by a spring 97', the other end of the lever C$^x$ being vertically arranged and adapted to be engaged at C', see Figure 3, by a beveled projection D' on a member D carried by an operating slide bar E. A spring 99 connected with the member D tends to keep the bar E at the extreme of its leftward movement as seen in Figures 3, 4 and 14. The bar E slides on rods 1486 and is guided by guide members 1313 which are the supporting guide members for the selector bars 1334. The bar E is in the form of a channel with the flanges thereof perforated to receive the detents F which are normally held upwards by springs 98. If the bar E is shifted to the right as seen in the drawings, the part D' will move the lever C$^x$ and thereby the lever C to bring the latter into a position in front of the tooth of the member B whereby to prevent other movement of the main shaft 625 and handle B-501 than incident to that which engages the member B with the member C. The selection of ejectors for operation involves a rightward longitudinal movement of one or more of the selector bars 1334 during a preliminary or initial movement of the handle B-501. It is this movement of one or more of such bars, as the case may be, which is transmitted to the slide bar E if a detent F is depressed to engage a bail 1309, to carry the bar E rightwards sufficient for the actuation of the parts C$^x$ and C to engage the latter with the member B. Normally none of the bails 1309 can engage the detents F to cause movement of the bar E, but means are provided associated with each coin holder of the coin magazine whereby if sufficient coins to make a payment are not in any holder a detent F associated therewith will be depressed sufficiently to engage an adjacent bail 1309 whereupon the locking of the actuator and handle B-501 against that movement which would cause ejection of coins, is effected as a result of the initial movement of the handle.

There is a feeler member G for each coin receptacle, said member being slidably mounted upon studs H$^1$ and H$^2$ carried by a bracket H attached to the front plate 938 of the casing of the auxiliary section. The projections G' of the members G may protrude through openings in the back plate 1515 of the magazine so as to engage coins in the coin holders. The member G is under constant tension of a spring 1678 and has cam slots G$^2$ and G$^3$ which tend to give it a peculiar rocking motion as it slides over its bearing studs H$^1$ and H$^2$ under the action of the spring 1678 after the coins in the coacting receptacle have diminished so as to permit the entrance of the projection G$^1$ into the receptacle (see Figures 6 to 9 inclusive).

At its upper end the member G has a projection G$^4$ adapted to be engaged by the edge of springs J$^1$ on the angle bar J, the latter being supported by the front ends of links 1532 (Fig. 2) which front ends are slotted to receive a guiding and supporting rod 1699. The springs J$^1$ act on the projections G$^4$ so as to hold the members G in positions in which the feeler projections G$^1$ are clear of the coin stacks. The links 1532 are provided at their rear ends with crooked cam slots 1532'. By means of studs 1677 passing through the slots 1532' the links 1532 are secured to the arms 543 on the shaft 615.

The links 1532 have spring-actuated latches K which when in engagement with the longitudinal tie-rod 1052 hold the links and the parts controlled thereby against movement under the tension of the springs 1679 connecting the links with the tie-rod 1053 and during initial movement of the shaft 615. However, if the movement of the shaft 615 is continued and the stud 1677 engages the rise portions of the cam slots 1532' the links 1532 will be lowered at their rear ends and likewise the latches K because the links engage lateral projections K' extending from the latches K beneath the links. In this manner the latches K will release the links 1532 and permit said links to move rearwards under the action of the springs 1679 drawing the angle bar J rearwardly out of engagement with the projections G⁴ of the members G and permitting the latter to move outward and downward on their studs H¹ and H² under the influence of the springs 1678. This outward and downward movement of the members G will not take place if the coin holders with which the members are associated contain a sufficient number of coins to make the payment called for by the transaction performed by the machine but will take place if any holder does not contain sufficient coins for the above purpose to pay out the sum called for by the selection. In other words, sufficient coins to make a payment when contained in the coin holders form a barrier against the projections G¹ entering a coin holder.

Associated with each double payment coin holder of the type shown in the Runquist patent previously identified herein is an additional selector bail 1370 which when actuated by a selector bar 1334 adjusts the front end of the ejector for the payment of a single coin and also adjusts the double payment coin stop mechanism. These bails 1370 are each provided with a stud 1478 at the end adjacent to the coin magazine. The coin stop 1550' is movable in front of the stack of coins in the receptacle and consists of the outer end of a stop lever 1550 pivoted at 1691 on a supporting bracket, the rear end of the lever 1550 engaging over a hook-shaped terminal of a cam lever 1382. The lever 1382 is pivoted to a stud 1477 and is adapted to be cammed upward by the engagement of the stud 1478 therewith when the bail 1370 is rocked under the actuation of its selector bar 1334. The above action of the bail 1370 is to lift the lever 1382 so as to rock the stop lever 1550 lowering the stop 1550' in front of the second coin from the bottom of the holder, and simultaneously the stud 1478 is adapted to cam downward the second lever 1311 which has a portion engaging immediately over the cooperating ejector 1307 so that the latter is forced downwards to engage only the lowermost coin in the receptacle. In this way a single coin ejection is had instead of the double coin ejection for which the parts are normally adjusted. Normally of course the stop 1550' is in front of the third coin from the bottom of the holder. Springs 1454 and 1660 are connected with the parts 1382 and 1550 respectively.

Each lever 1382 has a cooperating lever M, see Figures 6, 7 and 16 to 19, suitably mounted on a stationary plate 1312. These levers are best seen in Figures 16 to 19 and each embodies a long arm M' adapted to engage a projection G⁶ on the feeler member G, according to certain adjustments of the latter to be later described. The member G has a projection G⁵ in the form of a rearwardly extending arm (see Figures 6 to 9 inclusive) which arm is adapted to engage an adjacent detent F to project the latter downwardly if the member G is permitted to have certain movement obtainable only when insufficient coins are left in its coin holder to make the required payment. A depression of a detent F by the part G⁶ incident to movement of the member G places the detent F in the path of a bail 1309 ready to be actuated on the initial movement of the handle B–501, whereby to shift the bar E and cause locking of the main actuator against that portion of its movement by which and during which the ejectors are operated.

Figs. 6, 7 and 8 show the arrangement for a double delivery coin holder, while Fig. 9 shows the arrangement for a single delivery coin holder.

In connection with the double payment mechanism, it is to be observed, as shown in Figure 2, that the feeler member G will be held by the stack of coins out of engagement with the detent F when the angle bar J is withdrawn from its restraining engagement. Also in Figure 8 wherein a stack of but two coins is shown and the projection G' has entered the coin holder and rests on the upper coin, the detent F remains elevated. However, if there remains but one coin or if the supply be entirely exhausted from said coin holder the member G will of course assume a position such as shown in Figures 6 and 7, thereby actuating its detent F for engagement by the bail 1309 in such a manner as to effect locking movement of the bar E for locking the main actuator against operation of the ejecting mechanism. The machine will be locked if a selection calling for two coins is made and there remains one coin only in the coin-holder. If there remains one coin in the coin holder and a selection of that amount is made, the positive coin stop mechanism will be actuated by the rocking of the auxiliary bail 1370 and as an incident to such actuation the lever M will be lifted by engagement of the part 1382 therewith and its extremity will engage the projection $G^6$ so as to lift the arm $G^5$ and permit return of the detent F to the elevated position out of the path of movement of the bail 1309. The machine may then be operated to eject the one coin that remains.

Of course if the coin holder is empty and a selection calling for one coin is made the lever M will be lifted but owing to the advanced position of the feeler member G the projection $G^6$ will not be engaged by the lever M, and consequently the detent F will be held down and engaged by the bail 1309 when it is rocked so as to lock the main actuator against the effective ejecting movement of the same. There will be associated with the single payment coin holders suitable feeler members G such as shown in Figure 9. Since no double adjustment of these members is required, the parts for the double adjustment purposes are omitted, being unnecessary.

The various adjustments of the feeler members G, the cooperation of these members with the detents F, and the coaction of the levers M with the members G, are features best shown in Figures 6 to 9 and 16 to 19 inclusive. All of these figures excepting Figure 9 illustrate the cooperation of said parts in connection with the double or single payment devices. In Figure 6 the parts are adjusted so that the feeler member G has operated to cause cooperation of the detent F with the bail 1309, as when the payment calls for two coin ejection and only one coin is left in the coin holder. In Figure 7 the coin holder is empty and the feeler member G is operative to adjust its detent F for prevention of the operation of the ejecting mechanism. In Figure 8 the feeler member G is shown inoperative to prevent actuation of the ejecting mechanism and one or both of the coins are susceptible of being ejected. As shown in Figure 16, if the supply of coins in the cooperating coin holder is exhausted the member G will drop to the dotted line position of its member $G^6$ to throw into action the actuator locking mechanism through the detent F cooperating with said member G. According to Figure 17 the member $G^6$ will be raised from the dotted line to the full line position if one coin remains in the magazine in the double payment coin holder, and a single coin is selected for ejection. According to Figure 18, the part $G^6$ will not be raised when two coins are selected and one coin only is in the magazine because the member G will have dropped sufficiently far that the upper end M′ of the lever M will pass the projection $G^6$ and not prevent the depressing action of the lever G in respect to its detent F. As regards Figure 19, this figure is illustrative of the manner in which the portion M′ of the lever M is adapted to pass the projection $G^6$ when the magazine is empty and one or two coins are selected for ejection, the condition being that the lever M fails to interfere with the depression of the cooperating detent F.

Having thus described my invention, what I claim as new is:—

1. In a machine of the class described, the combination of a main controlling mechanism, operating means controlled by said mechanism for determining the pieces of money of an amount set up on the controlling mechanism and including a part especially constructed to be moved into and out of operative relation to said operating means, and instrumentalities whereby to automatically disable the said operating means as an incident to the movement of the said part out of operative relation to the operating means.

2. A machine substantially as claimed in claim 1 combined with manual means for also disabling said operating means, wherein the said manual means is operated to retain the said operating means disabled once the movable part is moved to an inoperative position and notwithstanding the restoration of said part to an operative position in relation to the operating means.

3. In a money handling machine, the combination with controlling and operating mechanism, of a paying out mechanism controlled and operated from the above mentioned mechanism, and including a removable money holding magazine, and instrumentalities operable as an incident to removing said magazine to disable the paying out mechanism without interfering with the said operating mechanism.

4. In a money handling machine, the combination of predetermining and operating devices, paying out mechanism comprising ejecting means and selecting means cooperating with the ejecting means, interconnections between the predetermining and operating devices and said selecting and ejecting means respectively, the paying out mechanism including a money magazine, and instrumentalities operable upon movement of the money magazine in relation to the remainder of the paying out mechanism whereby to disable the interconnections between the selecting and ejecting means, and the predetermining and operating devices.

5. In a machine of the class described, the combination of predetermining and operating devices, an actuating mechanism controlled by the operating devices, a selector mechanism controlled by the predetermining devices, a part associated with said selector and actuating mechanisms and detachable in relation thereto, and instrumentalities operable as an incident to detaching movement of said part whereby to disable the functioning of the selector and actuating mechanisms.

6. In a combined machine of the class described, a main accounting mechanism including controlling and operating devices, an auxiliary mechanism cooperating with the accounting mechanism and including a part necessary for the complete and proper operation of said auxiliary mechanism, said part being movable out of operative position in respect to the auxiliary mechanism, and means to interfere with the cooperation of the remainder of the auxiliary mechanism with the accounting mechanism operable when the said part is moved out of operative position in relation to the auxiliary mechanism.

7. Means substantially as claimed in claim 6, wherein the said movable part of the auxiliary mechanism is constructed in the form of a magazine from which money may be paid out by the auxiliary mechanism.

8. In a combined machine of the class described, the combination of a main accounting mechanism having controlling and operating devices, an auxiliary mechanism including selector and actuating devices operable from the controlling and operating devices first mentioned, the said auxiliary mechanism including a part necessary for its complete and proper operation but removable from and replaceable in relation to said mechanism, and instrumentalities automatically operable as an incident to removal of said removable part whereby to interfere with the operation of the remainder of the auxiliary mechanism by the controlling and operating devices of the accounting mechanism.

9. A machine substantially as claimed in claim 8 wherein said manual means is operable as an incident to the removal of said removable part from the auxiliary mechanism.

10. In a combined machine of the class described, the combination with an accounting machine including accounting devices and predetermining and operating means therefor, an auxiliary paying out machine comprising selector and ejector mechanisms controlled respectively from the predetermining and operating means of the accounting machine, and also comprising a detachable money magazine, and means operable as an incident to removal of said money magazine from the machine whereby to prevent the operation of the ejecting mechanism under the influence of the controlling and operating means.

11. Means substantially as claimed in claim 10, combined with instrumentalities whereby the selecting mechanism is prevented from being operated by the operating means of the accounting machine as an incident to removal of the money magazine.

12. In combination, an accounting machine including accounting devices and controlling and operating means therefor, paying out mechanism including selector devices and ejector devices, and a removable coin magazine associated with the ejector devices, interconnections between the controlling and operating means and the selector and ejector devices whereby the latter are operated from the former, means detachably connecting the coin magazine with the paying mechanism, operating instrumentalities adapted to actuate the said interconnections to render the paying mechanism inoperative, and means on the coin magazine to free said operating istrumentalities as an incident to removal of the coin magazine from the machine.

13. In a money handling machine, the combination of money holders, ejecting mechanism therefor, operating means for said ejecting mechanism, and means operated by said operating means for locking the operating means against actuation of the ejecting means when the supply of money in one or more money holders is diminished to a predetermined extent.

14. Means substantially as claimed in claim 13, combined with selector mechanism for the ejecting mechanism, means whereby the operating means actuates the selector mechanism, together with instrumentalities whereby the locking means aforesaid is actuated directly by the selecting mechanism.

15. In a money handling machine, the combination of coin holders, ejectors therefor, selector mechanism for the ejectors, a main actuator, connections for operating the selecting mechanism from the main actuator on initial movement of the latter, connections for operating the ejector mechanism from the main actuator on subsequent movement of the latter, and means for preventing said subsequent operation of the main actuator affecting the ejectors and operated by the main actuator itself through the selector mechanism.

16. Means substantially as claimed in claim 13, wherein the locking means comprises a member coacting with the said operating means, and means controlling the operation of said member including feeler members associated with the money holders, and actuating means for said locking member operable under the control of said feeler members.

17. Means substantially as claimed in claim 13, wherein the locking means comprises a member coacting with the said operating means and means controlling the operation of said member including feeler members associated with the money holders, and actuating means for said locking member operable under the control of said feeler members and including an actuating bar and detents adapted to be rendered operative by the feeler members for causing said actuating bar to be operated by the operating means for said ejecting mechanism.

18. In a money handling machine, the combination of money holders, ejecting mechanism therefor, a main actuator for said ejecting mechanism, a locking member cooperating with said main actuator to prevent certain movement thereof, controlling members associated with the money holders and rendered operable when the money in said holders is diminished to a predetermined extent, and detent means operable by said members to connect the locking member with the main actuator whereby said locking member may be caused to lock said main actuator at a predetermined time.

19. Means substantially as claimed in claim 18, combined with an actuating bar, carrying the said detent means and operable to shift the locking member.

20. Means substantially as claimed in claim 18, wherein the said controlling members are feeler members adapted to partially enter the money holders, the detent means comprising separate detents for the separate controlling members, together with an actuating bar adapted to be connected with the main actuator by the said device and adapted also to shift the locking member to throw the latter into cooperation with the main actuator.

21. A machine as claimed in claim 15 wherein the preventing means comprises controlling members associated with the coin holders and rendered operative as an incident to diminution to a predetermined extent of the coins in said holders, detents operable by said controlling members when they are rendered operative, and locking means adapted to be rendered operable by said device to prevent that subsequent actuation of the main actuator which affects the ejectors.

22. A machine as claimed in claim 15, wherein the preventing means comprises controlling members associated with the coin holders and rendered operative as an incident to diminution to a predetermined extent of the coins in said holders, detents operable by said controlling members when they are rendered operative, and locking means adapted to be connected with the selector mechanism by said detents and to be thereupon operated during the initial movement of the main actuator to cooperate with said actuator so as to prevent the said subsequent movement of the latter.

23. In a money handling machine, the combination of money holders, ejecting mechanism therefor, selector mechanism for the ejecting mechanism, controlling and operating means for said mechanisms including a main actuator, a locking member for controlling the operation of said main actuator, controlling members associated with the money holders and operable upon predetermined diminution of the money contained in said holders to render said locking member operable, the locking member being adapted to be rendered operative by the action of said controlling members to thereby cause said locking member to be operated by the main actuator itself.

24. In a money handling machine, the combination of money holders, ejecting mechanism therefor, selector mechanism for the ejecting mechanism, controlling and operating means for said mechanisms including a main actuator, a locking member for controlling the operation of said main actuator, controlling members associated with the money holders and operable upon predetermined diminution of the money contained in said holders to render said locking member operable, an actuating bar adapted to move the locking member into cooperation with the main actuator, and detents operable by the controlling members to connect said actuating bar with the selector mechanism for actuation with said selector mechanism.

25. In a money handling machine, the combination of money holders, ejecting mechanism therefor, selector mechanism for the ejecting mechanism, controlling and operating means for said mechanisms including a main actuator, a locking member for controlling the operation of said main actuator, feeler members G, detents F, and a bar E for shifting the locking member and detents to connect the said bar E with the selector mechanism, substantially as described.

26. In a money handling machine, the combination of money holders, ejecting mechanism therefor, selector mechanism for the ejecting mechanism, controlling and operating means for said mechanisms including a main actuator, a locking member for controlling the operation of said main actuator, feeler members G, an angle bar J, means on the angle bar cooperating with the members G as described, and means for moving said angle bar J from the main actuator.

27. A machine substantially as claimed in claim 3, combined with printing mechanism operable by said operating means and including a device for characterizing items denoting amounts paid from said magazine, and means whereby the action of said characterizing device is interfered with incident to removal of the magazine.

28. A machine substantially as claimed in claim 3, combined with mechanism for denoting transactions resulting from operation of the paying mechanism, and means to change the operation of the latter as an incident to removing the said magazine.

29. A machine substantially as claimed in claim 13, combined with means to manually nullify the effect of said locking means.

30. A machine substantially as claimed in claim 13, combined with manual means to render the locking instrumentalities ineffective after they have been operated.

31. A machine substantially as claimed in claim 17, combined with a release key for direct manual actuation of the locking member.

In testimony whereof I affix my signature.

AMOS H. HAWLEY.